United States Patent
Mesonzhnik et al.

(10) Patent No.: US 8,341,496 B2
(45) Date of Patent: Dec. 25, 2012

(54) REDUNDANT DATA IN STORAGE MEDIUM

(75) Inventors: Vadim Mesonzhnik, Yoqneam Illit (IL); Roy Varshavsky, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 12/367,071

(22) Filed: Feb. 6, 2009

(65) Prior Publication Data

US 2010/0205508 A1 Aug. 12, 2010

(51) Int. Cl.
*G11C 29/00* (2006.01)
(52) U.S. Cl. .................. 714/763; 714/766
(58) Field of Classification Search .......... 714/763, 714/766
See application file for complete search history.

(56) References Cited

U.S. PATENT DOCUMENTS

| | | | |
|---|---|---|---|
| 6,961,890 B2 * | 11/2005 | Smith | 714/763 |
| 7,559,004 B1 * | 7/2009 | Chang et al. | 714/758 |
| 2004/0133838 A1 * | 7/2004 | Ito | 714/766 |

* cited by examiner

*Primary Examiner* — Sam Rizk
(74) *Attorney, Agent, or Firm* — The Law Office of Michael E. Kondoudis (57) ABSTRACT

A data storage medium may have data stored on one physical portion of the medium and error correction and recovery data stored on a second physical portion of the medium. In one embodiment, a write once, read many medium may be written with data and the remaining capacity of the medium may be filled with error correction and recovery data. If a portion of the main data is corrupted, the error correction and recovery data may be used to recreate the corrupted data. The error correction and recovery data may be created to fill the unused capacity of the medium by prioritizing and selectively backing up the data when the data use more than half of the medium's capacity, or may create one or more redundant copies of the data if the data consume less than half of the medium's capacity, for example.

19 Claims, 6 Drawing Sheets

REDUNDANT DATA IN STORAGE MEDIUM

BACKGROUND

Physical data storage media, such as removable storage media, have a fixed capacity for data. For example, Digital Versatile Disk (DVD) is an optical media that encodes information on a circular plastic disk and can contain approximately 4.7 GB of data in a single sided, single layer format. A Compact Disk (CD) is a similar medium that can store approximately 700 MB of data.

In many cases, media such as DVD and CD may use forward error correcting techniques to encode additional redundant data within the data stream. When a portion of the data is unreadable or is deemed corrupt from a checksum, for example, the corrupted or unreadable data may be recreated using the redundant data. In many cases, the redundant data is interlaced or otherwise incorporated into the main data.

Data storage media are susceptible to corruption or data loss through various mechanisms. As data storage media increase in capacity, the likelihood of failures of individual bits increases given the billions and trillions of individual bits that may be stored. Such failures may be corrected using forward error correction techniques. However, other data loss mechanisms may damage the data along with forward error correction data that may be used for recovery. An example of such a data loss mechanism may be a scratch or other local damage to an optical medium.

SUMMARY

A data storage medium may have data stored on one physical portion of the medium and error correction and recovery data stored on a second physical portion of the medium. In one embodiment, a write once, read many medium may be encoded with data and the remaining capacity of the medium may be filled with error correction and recovery data. If a portion of the main data is corrupted, the error correction and recovery data may be used to recreate the corrupted data. The error correction and recovery data may be created to fill the unused capacity of the medium by prioritizing and selectively backing up the data when the data use more than half of the medium's capacity, or may create one or more redundant copies of the data if the data consume less than half of the medium's capacity, for example.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

When data are stored on a medium, such as a Compact Disk (CD), Digital Versatile Disk (DVD), BlueRay Disk, or other media, there may be unused space on the medium that may be used to store error correction and recovery data. If a problem with the data occurs when reading the medium, the error correction and recovery data may be used to correct or recover the problem data.

In many embodiments, the error correction and recovery data may be placed in a separate physical location from the main data. Some media, such as optical disks like CDs and DVDs, are susceptible to scratches. When the main data and the recovery data are in two separate physical locations, a scratch in the main data area may destroy some data but may not affect the error correction and recovery data, enabling the original data to be recovered and used.

The error correction and recovery data may be created using several different mechanisms. In one mechanism, the data may be prioritized and higher priority data may be duplicated in the error correction and recovery data. In another mechanism, blocks of parity data may be created from blocks of the main data.

Throughout this specification and claims, the term "error correction and recovery data" and similar terms are used to describe additional information that may be stored on a medium and used to recover, recreate, or otherwise correct problems with the data stored on the medium. In some cases, the error correction and recovery data may be duplicate copies of the main data and may operate to recover missing or corrupt data. In other cases, the error correction and recovery data may be used to calculate the original data using parity or some other technique and may be used to correct missing or corrupt data. The term "error correction and recovery data" is used as a generic term to indicate any type of information from which at least a portion of the original data may be corrected or recovered. The term "error correction and recovery data" is not meant to imply that the data are capable of being used for both error correction and recovery.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
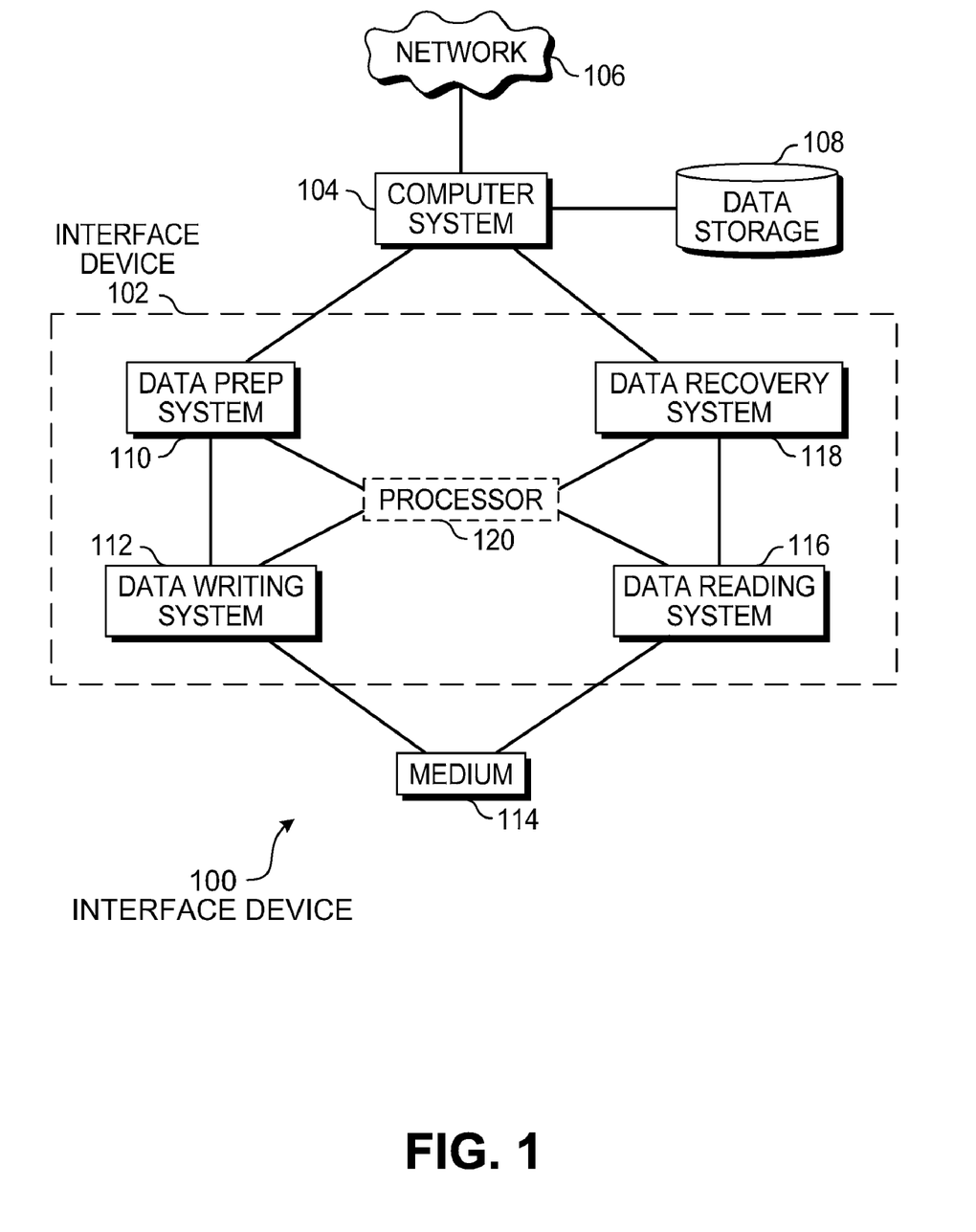
FIG. 1 is a diagram illustration of an embodiment showing an interface device that may create and use error correction recovery data.

FIG. 1 is a diagram of an embodiment 100 showing a system where error correction and recovery data may be stored on a medium. Embodiment 100 is a simplified example of a system that may create error correction and recovery data to at least partially fill any unused storage available on the medium.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a system that may be used to write and read data onto a medium, such as a CD, DVD, or any other storage medium. When data are written to the medium, any unused or free space on the medium may be used for error correction and recovery data. The error correction and recovery data may be used to recreate the original data in the event of the data becoming corrupted or unreadable.

The error correction and recovery data may add a level of protection from minor damage or data corruption for a medium such as an optical disk. Scratches or damage to the data portion of the optical disk may be overcome by recreating the original data from the error correction and recovery data on the disk. The error correction and recovery data may be in addition to various forward error correcting mechanisms that may be used when encoding and storing the data.

Error correction and recovery data may be added to some media with an additional cost of longer write times. For example, writing extra recovery data to a storage medium may use additional time when creating a single DVD. In some cases, the additional time may be several minutes long. The additional time may be justified in a read only medium, as the data may be protected in an additional manner.

In some cases, the additional error correction and recovery data may be added to other media with very little additional writing time. For example, a Universal Serial Bus (USB) flash storage device may have error correction and recovery data stored on the device with only an additional few seconds of writing time.

In some cases, the additional error correction and recovery data may be added to a medium with no additional writing time. For example, DVD and CD disks can be manufactured by molding the disks in a high volume production environment. In such a case, the additional error correction and recovery data may be included on a DVD or CD disk without any additional manufacturing cost.

The error correction and recovery data may take several different forms, depending on the embodiment. In cases where the data occupy less than half of the capacity of a medium, one or more duplicate copies of the data may be stored in the free space.

In cases where the data occupy more than half of the capacity of a medium, there may not be enough free space to store a duplicate copy of the data. In such cases, some embodiments may use a parity scheme that may create parity data calculated from blocks of data. Other embodiments may store portions of the data in an error correction and recovery data block, by selecting data from a prioritized list of data types or some other selection mechanism.

When data are read from the medium and an error is discovered in the data, the error correction and recovery data may be used to attempt to recreate that portion of the data. In many cases, metadata about the error correction and recovery data may be loaded to determine how the error correction and recovery data are organized and what methodologies may be used to attempt to recover the corrupted data.

Embodiment 100 is an example of a system that may create and use error correction and recovery data on a medium. An interface device 102 may connect to a computer system 104. The computer system 104 may be connected to a network 106 and may have local data storage 108.

Embodiment 100 may be implemented in a typical personal computer system. The interface device 102 may be a device that is capable of writing and reading to a medium, such as a CD or DVD optical disk. In such an embodiment, the interface device 102 may be an optical disk peripheral that is installed in a personal computer case and connects to the computer system 104 using an IDE or SCSI interface. Another embodiment may deploy the interface device 102 as separate device that connects to the computer system 104 using a USB connection, for example. Other embodiments may be implemented using various media and interface devices.

In some embodiments, many of the functions of the interface device 102 may be implemented in hardware, such as dedicated processors or circuits for performing certain functions, along with the hardware that may operate the optical disk read and write mechanisms. In many such embodiments, the interface device 102 may have a processor 120 that performs some of the functions of the interface device 102 and may offload certain functions from the computer system 104.

In some embodiments, the functions of the interface device 102 may be largely implemented in software. For example, a general purpose computer system may be configured with a software system that performs many of the functions of the interface device 102. One example of such an architecture may be a flash memory device that connects to a computer system 104 using a USB interface. In the example, the computer system 104 may perform many of the functions of the interface device 102 without specialized hardware, other than a USB interface.

The interface device 102 may prepare data to be written using a data preparation system 110, and then write the data using a data writing system 112. The data preparation system 110 may organize and pre-process data, then may create error correction and recovery data which is then written to the medium 114 by the data writing system 112. Various methods for creating the error correction and recovery data are discussed later in this specification.

A data reading system 116 may read raw data from the medium 114. A data recovery system 118 may analyze the data to determine if any errors exist and may attempt to recover or correct the data. The data recovery system 118 may use the error correction and recovery data stored on the medium 114 to recreate or correct the data before sending the data to the computer system 104.

In some embodiments, an interface device 102 that is a peripheral device to a computer system 104 may perform data correction and recovery operations without notifying or involving the computer system 104 unless an error has occurred.

The medium 114 may be any type of storage medium. In many cases, the storage medium may be a write once, read many type of medium. Other cases may use a write many, read many medium. Some examples of storage media may include optical storage media such as DVD and CD disks. Other examples may be magnetic media such as floppy disks, hard disk media, streaming tape media, as well as magnetic media on a card such as a credit card or identification card.

Still other examples may use flash memory storage or other solid state storage media that may be implemented in various forms. For example, a 'smart card', integrated circuit card, or other devices may have memory storage and may connect with a data reading system 116 using contact technology or contact-less technologies. An example of a contact technology may be found in Subscriber Interface Modules (SIM) cards that are used in some cellular telephones or cards that comply with ISO/IEC 7816 or ISO/IEC 7810 standards. An example of contact-less technology may cards that use RFID induction technologies such as those defined in ISO/IEC 14443 and ISO 15693 standards.

Embodiment 100 shows both read and write capabilities. Other embodiments may have read only capabilities while still other embodiments may have write only capabilities. For example, a device that is used for writing information to the medium 114 may have the capabilities of the data preparation system 110 and the data writing system 112, but may not have the capabilities of the data reading system 116 and the data recovery system 118. In another example, a device that is used for reading the medium 114 may have the data reading system 116 and the data recovery system 118, but may not have the data preparation system 110 and the data writing system 112.

Figure 2:
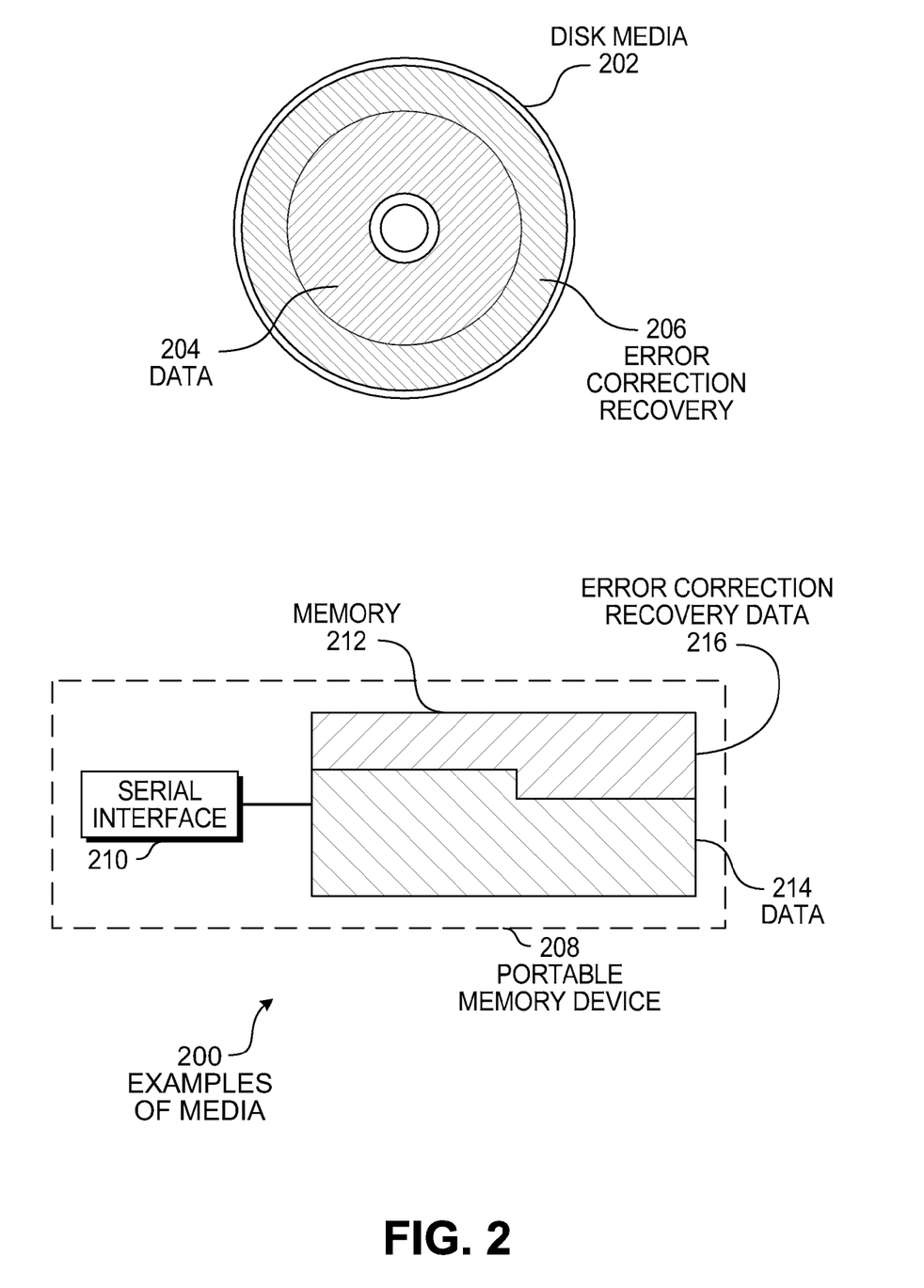
FIG. 2 is a diagram illustration of two example embodiments showing media that may have error correction and recovery data.

FIG. 2 is a diagram of an embodiment 200 showing a schematic representation of two different types of storage media and how data and error correction and recovery data may be stored on the media. The representations in embodiment 200 are merely for illustrative purposes.

A disk media 202 is illustrated in FIG. 2. The disk media 202 may be, for example, a CD or DVD disk. The data 204 is illustrated as occupying the inner portion of the disk media 202, while the error correction and recovery data 206 is illustrated as being in the outer portion of the disk media 202.

The disk media 202 may illustrate any type of disk-based media, including floppy disks, hard disks, and other types of circular media including optical disks such as CD and DVD disks. In such media, data to be stored in tracks that are concentric rings about a center axis. A moving read/write head may be positioned over one of the tracks while the disk spins about the center axis.

Disk media 202 may have the data 204 in one physical portion of the media while the error correction and recovery data 206 in another physical portion of the media. By separating the data 204 and error correction and recovery data 206 into separate, non-overlapping locations, a scratch or other physical damage to the media is likely to be isolated to either the data 204 or error correction and recovery data 206. Such a scratch may allow the data 204 to be read and recovered in some circumstances, regardless which section was damaged.

Some embodiments may write the data 204 onto the disk media 202 prior to creating and writing the error correction and recovery data 206. For example, a write once, read many media system may allow a user to select certain files to store on the medium and the system may physically write those files to the medium as they are selected. When the user indicates that the medium is to be removed from the system, the error correction and recovery data 206 may be created and written to the disk media 202. In such an embodiment, the error correction and recovery data 206 may be created that fills up much, if not all, of the remaining media.

A portable memory device 208 is illustrated in FIG. 2. The portable memory device 208 may be, for example, a flash memory device that connects to a USB port for another device or may be a smart card using contact or contact-less interface technologies. The portable memory device 208 may have a serial interface 210 and a memory 212. The memory 212 may be a solid state memory, such as flash memory. In some devices, the memory 212 may be a mechanically accessed media, such as a hard disk mechanism, for example.

In the memory 212, data 214 consumes a portion of the memory 212. The remaining portion of the memory 212 may be filled with error correction and recovery data 216.

The disk media 202 and the portable memory device 208 are merely two examples of different media that may use error correction and recovery data. In the two examples, the error correction and recovery data may be sized to fill up the unused or free space within the media. In the case of a write once, read many medium, the error correction and recovery data may be permanently stored on the medium. In the case of a write many, read many medium, the error correction and recovery data may be overwritten or changed when additions or changes are made to the data portions. When data are added to the data portions, the size of the error correction and recovery data may be reduced.

In many embodiments, the error correction and recovery data may occupy a large amount of the free space on a medium after the data are stored. In many cases, the error correction and recovery data may occupy 50% or more of the free space. Preferably, the error correction and recovery data may occupy at least 75% of the free space.

Figure 3:
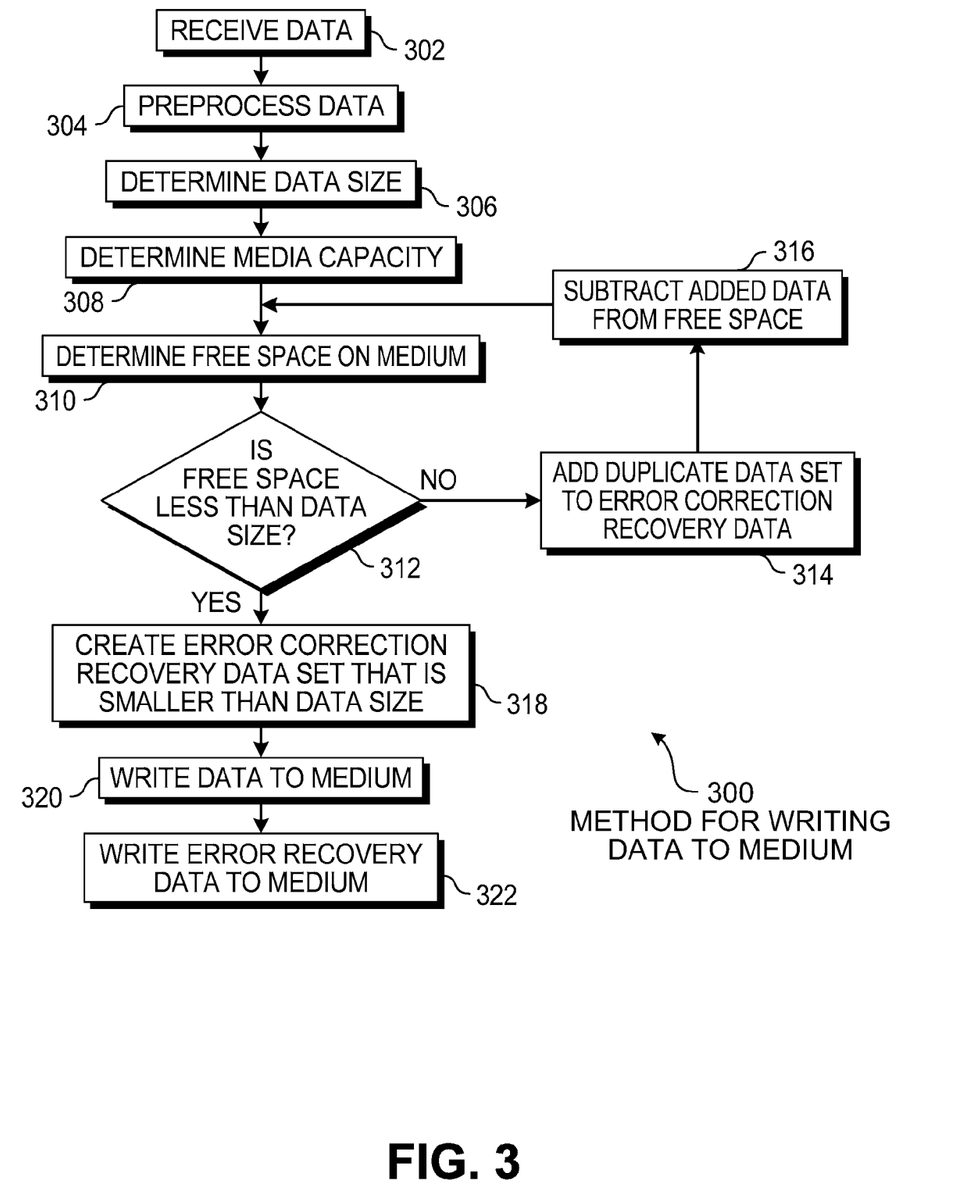
FIG. 3 is a flowchart illustration of an embodiment showing a method for writing data to a medium.

FIG. 3 is a flowchart illustration of an embodiment 300 showing a method for writing data to a medium. Embodiment 300 is a simplified example of merely one method that may be performed by a data preparation system 110 and data writing system 112 as shown in embodiment 100. Embodiment 200 is a high level sequence of steps that may be used to create the data and error correction and recovery data, then write the information to a medium.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a sequence that may be used to create an error correction and recovery data set and create a medium 114 as described in embodiment 100. After performing some preprocessing, an error correction and recovery data set may be created to fill up any free space on the medium. This may be performed by creating duplicate copies of the data, as well as by creating an error correction and recovery data set that is smaller than the data. In many cases, methods similar to embodiment 300 may utilize over 75% of the free space on a medium.

Data are received in block 302. The data may be any type of information that may be stored, including executable files, data files, or other information. In many cases, the data may be organized into individual files that may or may not have a file structure. In some cases, the data may not be organized into files.

The data may be preprocessed in block 304. The preprocessing in block 304 may include applying various forward error correcting codes to the data. Forward error correction codes are systems that add redundant data to the original data. When an error is identified, the forward error correction code may have a mechanism for recreating the original data.

Any type of forward error correction may be applied to the data, including block coding and convolutional coding. Block coding may work on fixed sized blocks, packets, or symbols of predetermined length. Convolutional coding may operate on bit or symbol streams of arbitrary length. In some cases, convolutional codes may operate on blocks of code as a block code. In some embodiments, block and convolutional codes may be combined in a concatenated coding scheme.

Some data may be encoded using a turbo code. A turbo code is a type of forward error correcting coding that combines two convolutional codes with an interleaver.

An example of block codes includes Reed-Solomon coding that is often used in CD and DVD standards, as well as many hard disk systems. Other examples include Golay, BCH, and Hamming codes. Hamming codes may be used in various types of solid state memory devices, such as NAND flash memory.

In cases where forward error correction is applied to the data in block 304, data that are subsequently read from a medium may be able to be corrected using forward error correction without having to resort to using error correction and recovery data that may be separately stored. When the forward error correction mechanisms are attempted and fail, the error correction and recovery information may be used to attempt to recreate the original data.

Forward error correcting codes may add redundant data into the original data. In many cases, the redundant data is added directly into a data stream and may, for example, be appended to each word, symbol, or block of data that is analyzed. The net result is that the redundant data may be located in close physical proximity to the original data. Thus, if a scratch or other physical defect were to damage the original data, there may be a high likelihood of the same physical damage to the redundant information.

The error correction and recovery data may be located in a different physical location than the original data so that a defect in the physical media may have less of a likelihood of damaging the error correction and recovery data when the original data are damaged.

In many cases, forward error correcting codes may be implemented in hardware devices that may be very highly optimized to rapidly process large amounts of data for both encoding and decoding data. Decoding data may refer to the process of determining the original data from an encoded set of data. For example, many block codes, convolutional codes, and turbo codes may have dedicated integrated circuits that perform the encoding and decoding processes.

In some embodiments, the preprocessing of block 304 may involve arranging or formatting the data in preparation for writing the data to a medium. For example, a group of files from a file system may be preprocessed to create a directory structure for the files. In some cases, the arrangement of the files may be determined by sorting the files by file type, file size, or some other criteria.

In some embodiments, the incoming data may be formatted or translated into a format that matches the storage medium. Such formatting may include applying an encryption algorithm or other changes to the data.

In block 306, the data size may be determined, along with the media capacity in block 308. In many embodiments, a medium may be blank when written, while in other embodiments, the medium may have some data or other information already stored on the medium in block 308.

The free space on the medium may be determined in block 310. The free space may be calculated as approximately the data size of block 306 subtracted from the media capacity of block 308. In some embodiments, the free space may be calculated to be the data size of block 306 and the estimated size of a metadata set subtracted from the media capacity of block 308. The metadata set may define various parameters and other information about an error correction and recovery data set.

In block 312, the free space is compared to the data size. If the free space is larger than the data size in block 312, a duplicate data set may be added to the error correction and recovery data in block 314. The size of the added data from block 314 is subtracted from the available free space in block 316 and the process may return to block 310.

When the available free space is larger than the data size, a duplicate copy of the data may be placed in the error correction and recovery data. Such a case may have at least one fully redundant copy of the data in the error correction and recovery data.

In cases where the available free space is much larger than the data size, the method of embodiment 300 may loop through the sequence of blocks 312, 314, 316, and 310 several times, each time creating another duplicate set of data in the error correction and recovery data.

Figure 4:
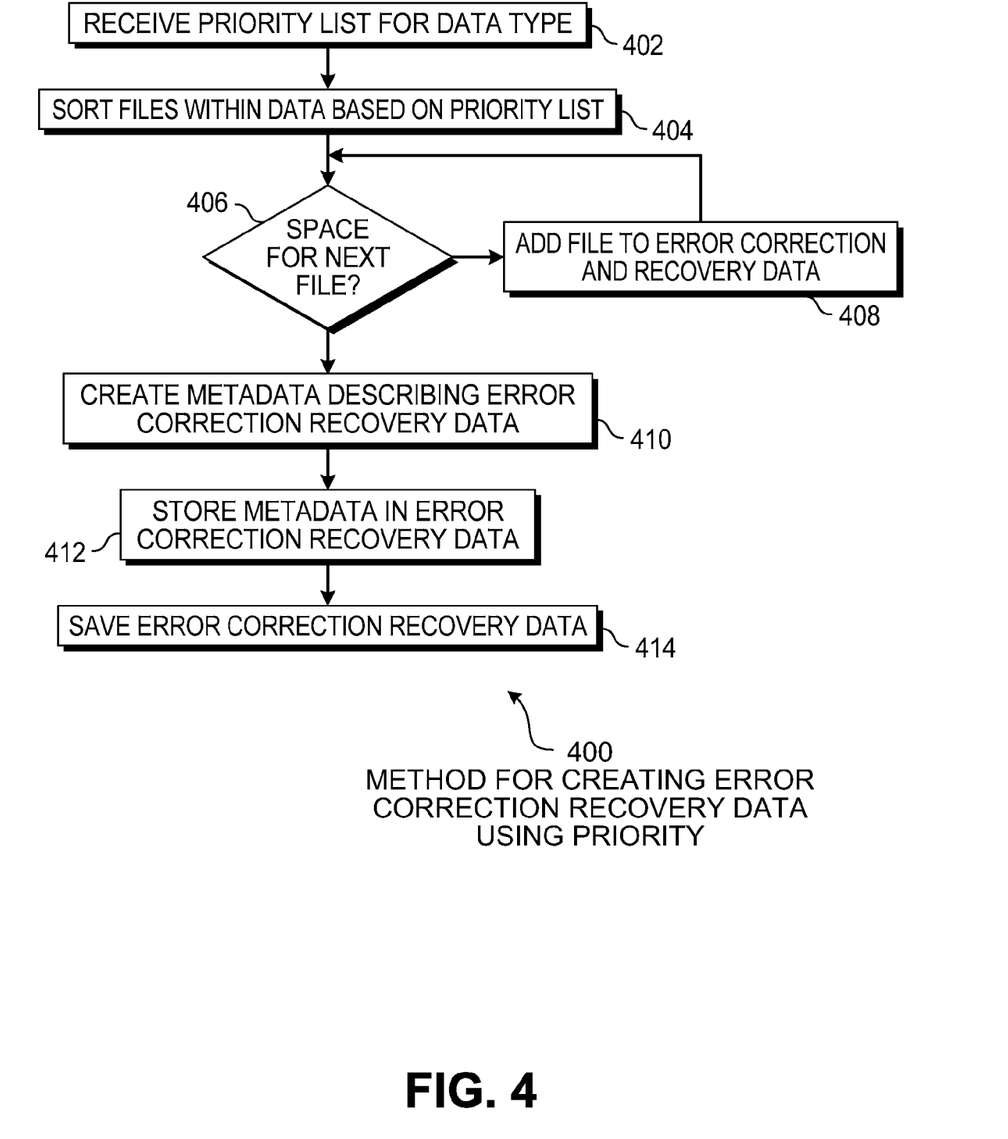
FIG. 4 is a flowchart illustration of an embodiment showing a method for creating error correction and recovery data using priority.
Figure 5:
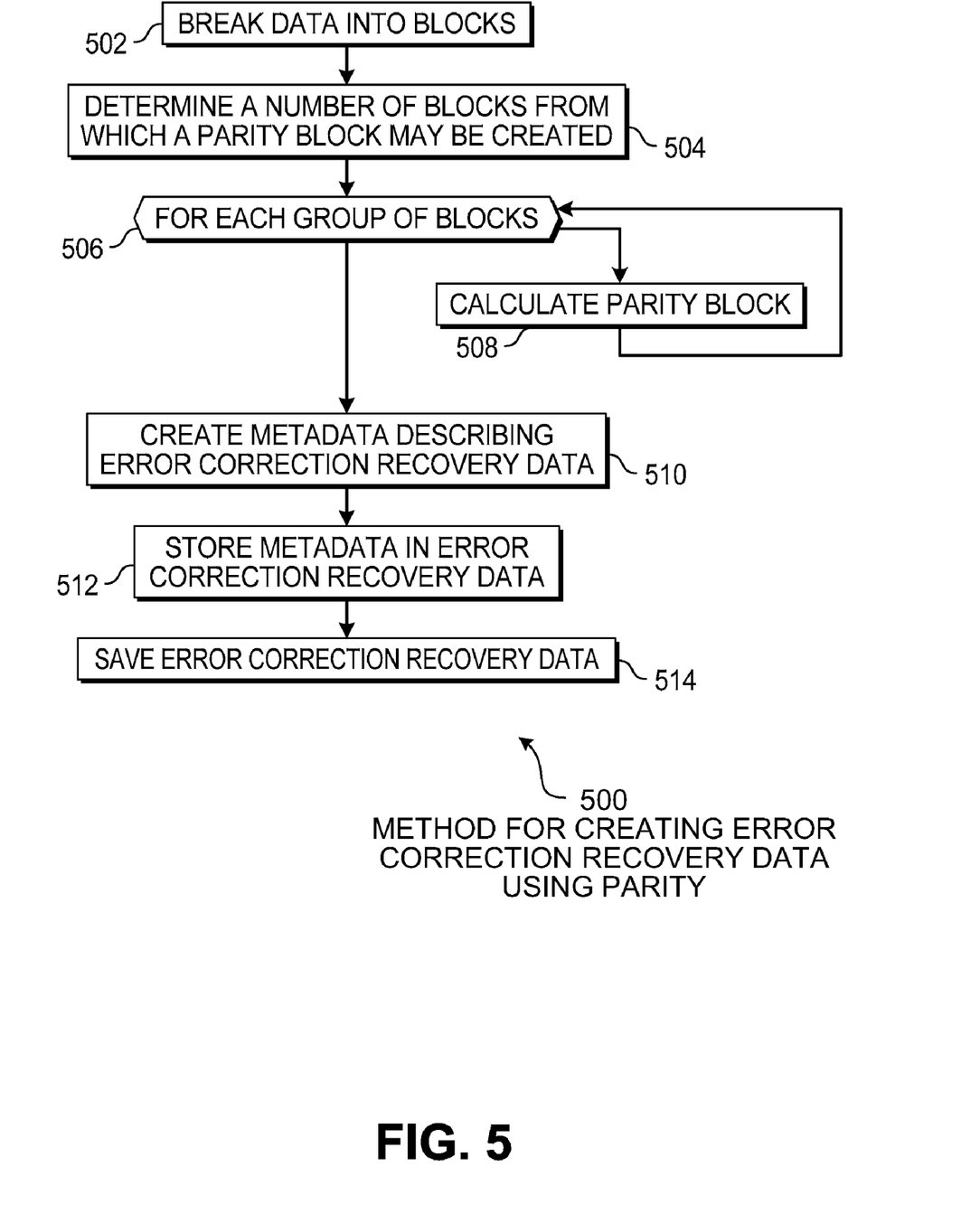
FIG. 5 is a flowchart illustration of an embodiment showing a method for creating error correction and recovery data using parity.

When the free space is less than the data size in block 312, an error correction and recovery data set may be created in block 318 that is smaller than the data size. Two examples of such a process are illustrated in embodiments 400 and 500 described in this specification. Embodiment 400 is an example of priority based method for selecting a subset of the data to include in an error correction and recovery data set. Embodiment 500 is an example of a method for creating a parity block within the error correction and recovery data set from which the original data may be recreated.

In some cases, an error correction and recovery data set may include both redundant or duplicate sets of data added in block 314 and a smaller error correction and recovery data set defined in block 318. Such embodiments may have multiple layers of redundancy for protecting the data.

The data may be written to the medium in block 320 and the error correction and recovery data may be written to the medium in block 322. In many embodiments, the sequence of writing the data in block 320 and the error correction and recovery data in block 322 may cause the data and error correction and recovery data to be stored in two different physical locations on the medium. For example, many disk-based media may start writing data at the innermost tracks and proceed to fill the media track by track. In such an example, the data may be written to the medium in a manner similar to the disk media 202 shown in FIG. 2.

In some embodiments, the data may be written in block 320 such that the data are placed in contiguous memory locations which would be separate from the memory location used to store the error correction and recovery data stored in block 322. Some such embodiments may have special commands or instructions that may be used during the writing process to ensure that the data are placed in contiguous memory.

FIG. 4 is a flowchart illustration of an embodiment 400 showing a method for creating an error correction and recovery data set that is smaller than the data from which it is generated. Embodiment 400 is an example of a method that may be performed for block 318 of embodiment 300. Embodiment 400 is an example of a method that adds duplicate versions of files within the data based on a priority system. Embodiment 500, illustrated later in this specification, is an example of a different method that creates an error correction and recovery data set that uses parity.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a method that creates an error correction and recovery data set by adding files to the data set based on a priority of files or file types. The error correction and recovery data set created with embodiment 400 may contain duplicate copies of a subset of the original data and may be useful in recovering corrupted or missing data from those portions that are copied.

A priority list for data types may be received in block 402. In some embodiments, a user may be able to define a priority list. For example, a user may be able to rank individual files or file types that may used to create a priority list. The user may be able to perform a ranking after identifying the data that is to be stored on the medium.

The priority list may define any type of parameter on which files may be ranked for inclusion into the error correction and recovery data set. Many priority lists may rank files by file type, but others may include file name, file size, file creation date, and may include filters or sorting criteria based on the contents of files. In some embodiments, the files may be sorted on two or more criteria, such as first sorting by file type then by file size.

Some embodiments may have a priority list that is at least partially predefined. For example, a user may have a priority list that is predefined and used for multiple storage sessions. The priority list may rank various file types and may or may not include rankings for individual files.

In some cases, a priority list may at least partially predefined in that certain data, such as file system metadata, may be some of the highest priority data. Similarly, some data may be predefined to be at the lowest end of the priority scale. Some data may be predefined to be excluded from an error correction and recovery data set.

In block 404, the files within the data set may be sorted based on the priority list. The sorting may use various criteria, such as file size, file name, file type, or other parameters that may be defined in a priority list.

If the error correction and recovery data has enough space for the next file in block 406, the file may be added to the error correction and recovery data in block 408. The file may be the highest priority file after the sorting that occurred in block 404. The sequence of blocks 406-408 may be repeated until the error correction and recovery data is full to the point where the next file cannot fit in the data set.

In some embodiments, the files that are added to the error correction and recovery data may be compressed, compacted, or otherwise reduced in size. Such compression may enable a larger number of files to be stored in the free space on a medium.

After the error correction and recovery data has been defined, metadata describing the error correction and recovery data is defined in block 410. The metadata may be various parameters or information that may be used by a data recovery system to identify and use the error correction and recovery data. For example, the metadata may include the file names of the files included in the error correction and recovery data, as well as any parameters that may be used to uncompress or otherwise recreate the files.

The metadata may be added to the error correction and recovery data in block 412. In many cases, the actual or projected size of the metadata may be incorporated into the determination in block 406 of whether a file will fit within the error correction and recovery data.

Once the metadata are added to the error correction and recovery data, the error correction and recovery data may be saved in block 414.

FIG. 5 is a flowchart illustration of an embodiment 500 showing a method for creating an error correction and recovery data set that is smaller than the data from which it is generated. Embodiment 500 is an example of a method that may be performed for block 318 of embodiment 300. Embodiment 500 is an example of a method that creates parity data from which missing portions of the data may be recreated.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a simplified method for creating a set of parity data that may be used to recreate portions of the original data.

The original data may be divided into blocks in block 502. The block size used in block 502 may be any size, from individual bits to blocks that are megabytes in size.

In block 504, a calculation may be performed to determine the number of blocks from which a parity block may be created. Parity blocks may be created by performing an XOR command on one, two, or more blocks of data. When two blocks are combined to determine a parity block, the parity block may consume 50% of the size of the blocks of data from which the parity block is created. When four blocks are combined to determine a parity block, the parity block may consume 25% of the size of the block of data from which the parity block is created.

A generalized formula for determining the number of blocks to use for a parity block may be found by taking the integer portion of dividing the data size by the free space on the medium.

For each group of blocks in block 506, the corresponding parity block may be calculated in block 508 by performing a bit level XOR command on the blocks.

Parity blocks may be used to recreate a missing block of data by performing an XOR on the parity block along with the remaining blocks used to create the parity block. This mechanism may allow any of the blocks to be recreated providing that only one of the blocks is corrupted but not two or more.

Other embodiments may use dual or triple parity to allow recreation of two or three missing blocks, respectively.

After the error correction and recovery data has been defined, metadata describing the error correction and recovery data is defined in block 510. The metadata may be various parameters or information that may be used by a data recovery system to identify and use the error correction and recovery data. For example, the metadata may include the file names of the files included in the error correction and recovery data, as well as any parameters that may be used to uncompress or otherwise recreate the files.

The metadata may be added to the error correction and recovery data in block 512. In many cases, the actual or projected size of the metadata may be incorporated into the determination performed in block 504.

Once the metadata are added to the error correction and recovery data, the error correction and recovery data may be saved in block 514.

Embodiments 400 and 500 are merely two examples of methods by which an error correction and recovery data set may be created. Other embodiments may use still other methods and techniques for using the free space on a medium to store some type of error correction and recovery data.

Figure 6:
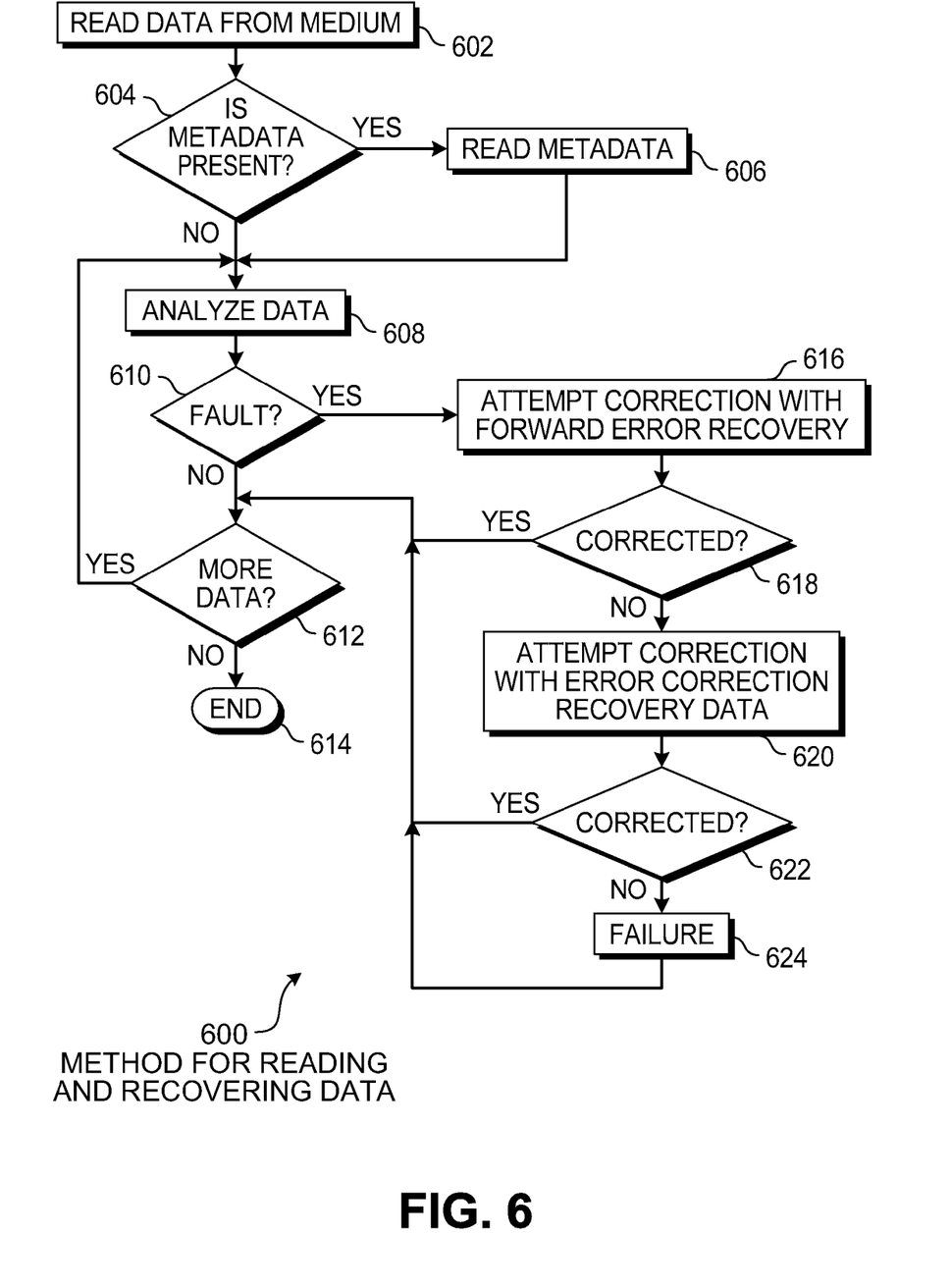
FIG. 6 is a flowchart illustration of an embodiment showing a method for reading and recovering data.

FIG. 6 is a flowchart illustration of an embodiment 600 showing a method for reading and recovering data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 is a simplified example of a method that may be used to read data and then recreate the data if the data are corrupted or missing. The method first attempts to correct the data using forward error correction information that may be present in the data. If the forward error correction is not successful, the method may attempt to recreate the data using error correction and recovery data.

Data may be read from the medium in block 602. If metadata concerning the error correction and recovery data is present in block 604, the metadata may be read in block 606.

The data may be analyzed in block 608 to determine if a fault is present in block 610. The analysis of block 608 may be any type of error detection scheme, such as a parity bit check, cyclic redundancy check (CRC), checksum, hash function, polarity symbol reversal, and other schemes.

If no fault is determined in block 610 and more data is present in block 612, the process may return to block 608 to analyze another portion of the data. If no more data is present in block 612, the process may end in block 614.

If a fault is determined block 610, an attempt may be made to correct the data using any embedded forward error correction mechanism in block 616. The particular method used for the data correction will depend on the type of forward error correction encoded in the data, if any.

If the forward error correction mechanism is successful in correcting the data in block 618, the process may return to block 612.

If the forward error correction mechanism is not successful in correcting the data in block 618, an attempt may be made to recreate the data in block 620 using the error correction and recovery data.

The method used for recreating the data in block 620 may depend on the type of information stored in the error correction and recovery data. For example, if the error correction and recovery data contains backup copies of the corrupted data, the method for recreating the data may include reading and analyzing the backup copy.

If the error correction and recovery data contains parity information, the method for recreating the data may include identifying the blocks used to create the parity block, ensuring that each of the data blocks other than the corrupted data blocks are correct, ensuring that the parity block is correct, and performing an XOR operation on the known good blocks along with the parity block to recreate the corrupted block.

Other embodiments that use different types of error correction and recovery data may use different recovery methods.

If the data recovery is successful in block 622, the process may return to block 612. If the data recovery is not successful in block 622, the block may be marked as corrupted and a failure may be returned in block 624. The process may return to block 612 to process additional data.

Embodiment 600 illustrates one method that uses an error correction and recovery data set as a second layer of protection against losing data from a medium. The error correction and recovery data may be stored in free space on a medium that otherwise would be unused space. Other than additional processing and write time, the error correction and recovery data may provide additional layer of protection without incurring additional data storage costs.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
receiving data to store on a medium, said medium having a data capacity, and said data having a data size less than said data capacity;
storing said data onto said medium in a first physical location;
identifying an unused space being a second physical location on said medium being approximately said data capacity minus said data size;
creating an error correction recovery set of data based on said unused space by determining that said unused space is at least as large as said data size, and creating said error correction recovery set of data to include at least one copy of said data; and
storing said error correction recovery set of data on said medium in said second physical location.

2. The method of claim 1, said error correction recovery set of data being at least 75% of said unused space.

3. The method of claim 1, said creating said error correction recovery set of data being performed by a method comprising:
determining that said unused space less than as said data size;
prioritizing said data to create a prioritized list of said data;
identifying a portion of said data from said prioritized list that is smaller in size than said unused space; and
creating said error correction recovery set of data from said portion of said data.

4. The method of claim 3, said error correction recovery set of data comprising parity information created from said data.

5. The method of claim 1, said unused space being contiguous space.

6. The method of claim 1, said first physical location being a first contiguous space, said second physical location being a second contiguous space not overlapping with said first contiguous space.

7. The method of claim 1, said data comprising forward error correcting information for said data.

8. The method of claim 1, said medium being an optical disk.

9. The method of claim 1, said medium being a write once, read many medium.

10. A method comprising:
reading data from a medium, said data being stored on said medium with forward error correcting information, said medium comprising an error correction recovery set of data;
detecting an error in a first block of said data;
attempting to recover said first block of said data using a forward error correcting mechanism configured to recover said first block of said data using said forward error correcting information; and
recovering said first block of said data using said error correction recovery set of data, when recovery of said first block of said data using said forward error correcting mechanism fails,
wherein said error correction recovery set of data is created based on said data that is read during said reading by:
determining that an unused space on said medium is less than a data size of said data that is read during said reading;
prioritizing said data that is read during said reading to create a prioritized list of said data;
identifying a portion of said data from said prioritized list that is smaller in size than said unused space, and
creatin said error correction recovery set of data from said identified portion.

11. The method of claim 10, said forward error correcting information being one of a group composed of:
a block code;
a convolutional code; and
a turbo code.

12. The method of claim 10, said error correction recovery set of data comprising a subset of said data.

13. The method of claim 12, said subset of said data being selected based on a predetermined priority for files within said data.

14. The method of claim 10, said error correction recovery set of data comprising parity information created from said data.

15. The method of claim 10, said error correction recovery set of data comprising a duplicate set of said data.

16. A device comprising:
a data preparation system configured to receive data to be stored on a medium and prepare said data by performing a method comprising:
determining a capacity for said medium;
determining a data size for said data;
determining a free space being no greater than said capacity minus said data size; and
using said data to create an error correction recovery set of data by
(i) determining that said free space is at least as large as said determined data size, and
(ii) creating said error correction recovery set of data to include at least one copy of said data;
a data writing system configured to write said data onto said medium using in a first physical location and to write said error correction recovery set of data onto said medium in a second physical location.

17. The device of claim 16, said medium being a removable optical medium.

18. The device of claim 16, said error correction recovery set of data comprising parity information created from said data.

19. The device of claim 16, said medium having a serial interface.

* * * * *